April 16, 1940.　　　　　C. M. WERT　　　　2,197,575
DUAL-RATIO MECHANISM FOR AUTOMOBILES
Filed Aug. 7, 1936　　　　2 Sheets-Sheet 1

Inventor:
Charles M. Wert
by Milburn & Milburn
Attys.

April 16, 1940.   C. M. WERT   2,197,575
DUAL-RATIO MECHANISM FOR AUTOMOBILES
Filed Aug. 7, 1936   2 Sheets-Sheet 2
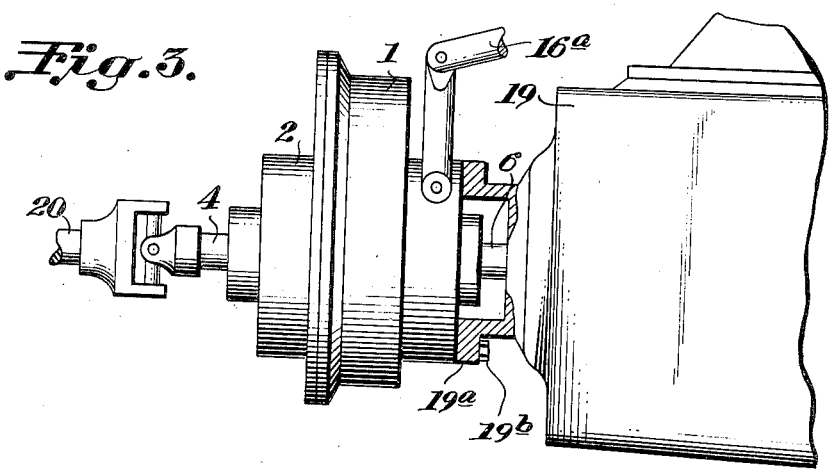
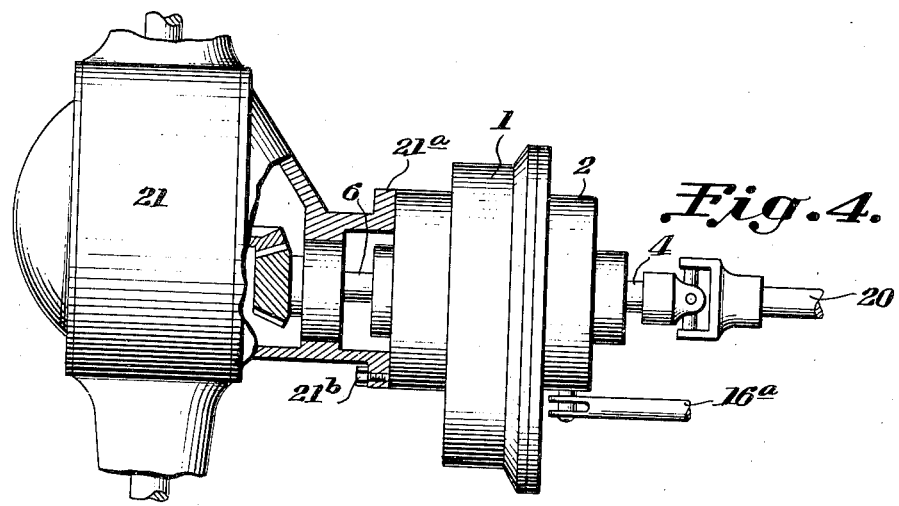
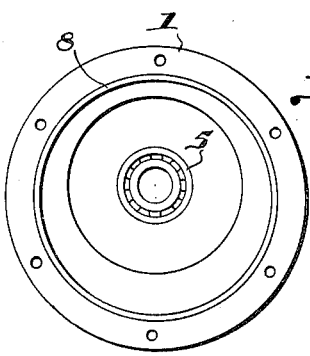
Inventor:
Charles M. Wert
by Milburn & Milburn
Attys.

Patented Apr. 16, 1940

2,197,575

UNITED STATES PATENT OFFICE 2,197,575

DUAL-RATIO MECHANISM FOR AUTOMOBILES

Charles M. Wert, Cleveland, Ohio, assignor of one-third to Frank F. Petznick, Cleveland Heights, Ohio, and one-third to Clarence H. Dray, Lakewood, Ohio Application August 7, 1936, Serial No. 94,859

7 Claims. (Cl. 74—332)

This invention relates to the art of dual-ratio mechanism for automobiles and is of the same general class as that illustrated in my prior U. S. Patents No. 1,918,200, July 11, 1933, and No. 2,046,282, June 30, 1936.

In the present case, the mechanism is of such type and construction that it can be attached either between the automobile transmission and the drive shaft, or between the drive shaft and the rear axle housing, or elsewhere along the drive shaft of the motor vehicle.

The object of this invention is to provide an improved means whereby any given ratio established in the regular automobile transmission can be modified or the driving force can be transmitted direct to the rear axle without any modification.

A more specific object is to provide a unitary assembly of speed-modifying mechanism which is enclosed within a self-contained housing and within which there is provided a clutch control means upon opposite sides of the mechanism and operatively associated therewith, whereby the same unitary mechanism is reversible for use either as an over-drive or as an under-drive assembly and whereby also the mechanism may be rendered ineffective in either case so as to obtain normal speed or no power at all. Thus, the present invention contemplates also the possibility of disconnecting the driving force from the rear axle independently of the regular clutch and conventional transmission, and the provision of means for accomplishing this object as part of the unitary assembly herein described.

The objects of my invention comprehend also the designing and refinement of parts that are pecular to the present combination and that are especially advantageous from the standpoint of simplified manufacture and servicing of the same.

Other objects will appear from the following description and claims when considered together with the accompanying drawings.

Fig. 2 is an end interior view of the enclosing housing with the cover removed;

Fig. 3 illustrates the installation of my present improved unitary assembly at a point near the conventional transmission of an automobile;

Fig. 4 illustrates the installation of the same assembly at a point near the rear axle housing of an automobile;

Figure 1:
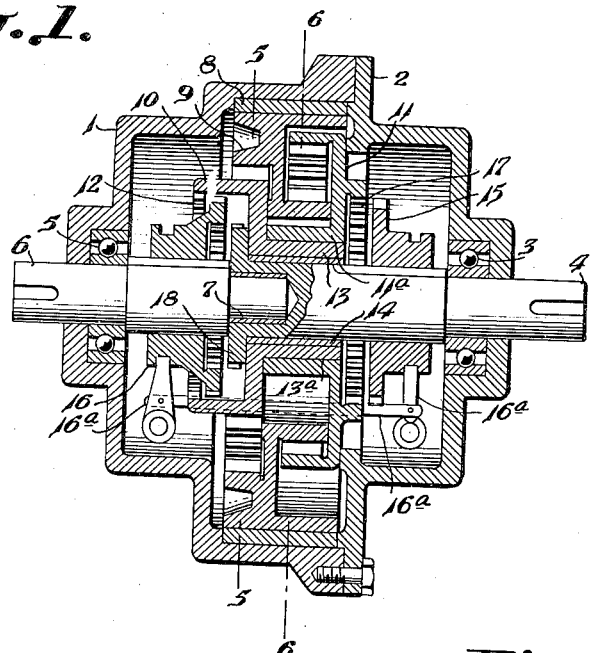
Fig. 1 is a longitudinal sectional view of my mechanism.
Figure 6:
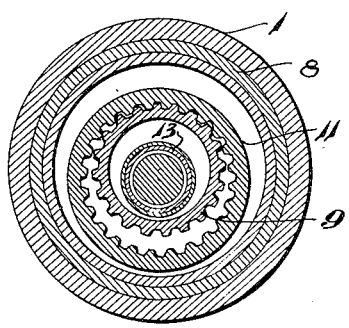
Fig. 6 is a sectional view taken on line 6—6 of Fig. 1.
Figure 5:
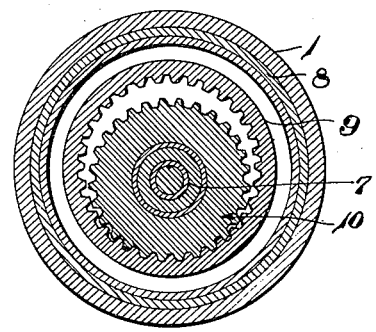
Fig. 5 is a sectional view taken on line 5—5 of Fig. 1.

It is to be understood that the present form of disclosure is merely for purposes of illustration and that various other modifications may be effected without departing from the present invention as herein set forth and claimed.

The enclosing housing 1 has an end portion thereof provided with a detachable cover 2 which has a bearing 3 for the support of power transmission shaft section 4. The housing 1 has also a bearing 5, oppositely disposed to bearing 3, for the support of power transmission shaft section 6. The shaft section 6 is also supported at one end in the bearing 7 within the end of shaft section 4, thus providing a straight-line support for both of the shafts 4 and 6.

The housing 1 has a bearing 8 which is eccentric to bearings 3 and 5 and which is for the support of the combination internal-external idler gear 9, said eccentric bearing 8 being so disposed that the teeth of the idler gear are always in mesh with those of the external and internal gears 10 and 11, respectively. External gear 10 has clutch teeth 12 provided upon one side thereof and has an elongated hub portion 13 provided upon the opposite side thereof for the support of the internal gear 11 and for its own support concentrically around the shaft section 4 by means of the bearing 14. The internal gear 11 has a suitably formed annular flange 11a, and there is provided a bearing 13a between the hub 13 and the flange 11a.

The toothed clutch members 15 and 16 are splined or otherwise slidably keyed to the shaft sections 4 and 6, respectively, so as to rotate therewith, said clutch members being shiftable back and forth therealong as a unit by the operator through suitable lever and yoke connections 16a which extend to the dash board of the automobile so as to be readily accessible for manipulation.

The clutch members 15 and 16, when shifted together in one direction, are adapted to engage the clutch teeth 17 and 12 of the internal and external gears 11 and 10, respectively; and when said shiftable clutch members are moved together in the opposite direction, the internal tooth portion of clutch member 16 is adapted to engage clutch portion 18 which is formed as an integral part of the end of shaft section 4.

In the present illustration, (Fig. 1), the speed-modifying mechanism is shown in neutral position; that is, the clutch members are out of engagement and there is no power being transmitted.

In order to obtain effective transmission of one speed, as for instance what might be referred to as normal speed (referring to Fig. 1), the clutch members 15 and 16 are shifted together by means of the lever control means so as to engage the internal teeth of member 16 with the tooth portion 18 of shaft section 4. With these members thus engaged, there will be obtained a direct drive or unmodified speed, and the internal and external gears 11 and 10 and the combination internal-external idler gear 9 remain relatively stationary as they do not rotate about their own centers.

The unmodified speed just referred to is that speed corresponding to any driving speed from the automobile transmission to one of the shaft sections of the assembly.

In order to obtain the transmission of a modified rate of speed with this device, the shiftable clutch members are moved together into engagement with the clutch teeth 12 and 17 of the external and internal gears 10 and 11, respectively. With the clutch members thus engaged, all of the speed-modifying gears 9, 10 and 14 rotate about their own axes, the teeth of these gears being always in mesh.

By being reversible, my unitary assembly can be arranged in the drive shaft in either manner, so as to serve as an over-speed or an under-speed. For instance, in Fig. 3, it is shown arranged as an under-drive; while in Fig. 4 the same assembly is shown as occupying reverse arrangement to serve as an over-drive.

By providing the shaft sections 4 and 6 as part of the unitary assembly, this device can be sold as an accessory and installed by the user in his automobile at any point in the drive shaft by removing a suitable length thereof and connecting the shaft sections 4 and 6 to the adjacent broken ends of the drive shaft in a suitable manner. Suitable means of support would also be provided for the housing of this assembly. Or, by adopting this assembly as part of standard equipment, the original installation can be made for either over-drive or under-drive by using the same assembly and at the particular point desired.

As indicated in Fig. 3, the transmission housing may be provided with an integral flanged extension 19a of the same diameter as the intermediate part of the housing for bolting thereto, as indicated at 19b. Likewise in Fig. 4, the differential housing 21 has an integral flanged extension 21a of the same diameter as the intermediate part of the housing for bolting thereto, as indicated at 21b.

In order that the lever connection means 16a may extend through the near side or end of the housing, an opening will be provided at corresponding points in the middle parts of the housing body 1 and the housing cover 2, one of these openings to be closed when not in use. There will also be provided suitable detachable means of connection between the lever means 16a and the clutch yoke means within the housing so as to permit this interchangeable connection. Or, the same single connection, as shown herein, may be used in both instances by providing suitable lever connections outside of the casing or housing of the assembly.

In Fig. 4, the shaft section 6 may be long enough for connection to the pinion of the differential, and the shaft section 4 may be connected to the one side of the universal in the drive shaft 20. In Fig. 3, the shaft section 4 may be connected directly to the universal joint in drive shaft 20, and shaft section 6 may be connected in any suitable manner to the aligned shaft of the transmission within the transmission housing 19.

Among the distinguishing characteristics of this improved assembly, I attach considerable importance to the fact that the housing provides the eccentric bearing portions for the bearings 3 and 5 and the eccentric bearing portion for the bearing 8, these bearings affording support for the entire speed-modifying mechanism.

I wish also to emphasize the fact that this is a reversible duplex unitary form of assembly; that is, either of the shaft sections of the assembly may serve as the power input shaft and thus this same unit may be used as an over-drive or under-drive without making any changes whatsoever in the speed-modifying mechanism itself, and in either arrangement there may be normal transmission of power according to the gear ratio selected at any time in the regular transmission or there may be no power transmitted at all.

With my structure and arrangement of parts, as herein illustrated, it is possible to provide the bearings 7, 8, 13a and 14 in the form of bushings. Also, the gears are so constructed and arranged that there can be obtained a very compact form of assembly.

The present combination is comparatively simple in its construction and yet extremely dependable and efficient in service and durability and is thus comparatively inexpensive from the standpoints of manufacture and upkeep.

What I claim is:

1. In a speed-modifying mechanism for automobile, a unitary, self-contained, reversible assembly comprising a housing, internal and external gears and an internal-external idler gear in intermeshing relation and enclosed within said housing and adapted to produce an over-speed or under-speed according to the arrangement of the assembly in connection with the drive shaft of the automobile, said assembly including also aligned stub shafts extending into said housing, one of said shafts affording concentric bearing means for said external gear, said external gear having a hub portion to serve as a bearing means for said internal gear, said idler gear having bearing in said housing eccentrically with respect to the longitudinal axis of said shafts, said assembly including also a clutch member splined upon each of said shafts within said housing and adapted for operative connection with the internal gear upon the one side of the assembly and with the external gear upon the other side of the assembly, and one of said clutch members having means of operative engagement with the other of said shafts, whereby the gears can be rendered effective or ineffective by manipulation of the clutch members, or the shafts can be operatively connected together for direct drive therethrough while simultaneously disconnecting said gears from said shafts, or there can be prevented transmission of any power through the shafts, and means for manipulating said clutch members in unison.

2. In a speed-modifying mechanism for automobile, a unitary, self-contained, reversible assembly comprising a housing, internal and external gears and an internal-external idler gear in intermeshing relation and enclosed within said housing and adapted to produce an over-speed or under-speed according to the arrangement of the assembly in connection with the drive shaft of the automobile, said assembly including also aligned stub shafts extending into said housing, said housing having bearing means for said shafts, one of said shafts affording concentric bearing means for said external gear, said external gear having a hub portion to serve as a concentric bearing means for said internal gear, said idler gear having bearing means in said housing itself eccentrically with respect to the longitudinal axis of said shafts, said assembly including also clutch means arranged within said housing and upon opposite sides of the gears for effecting operative relation between said internal and external gears, respectively, and said shafts or for rendering the same ineffective, and said clutch means having also releasable means for effecting direct drive connection between the shafts and simultaneously disconnecting said gears from said shafts, and means for connecting said reversible assembly in either of its two positions with the automobile drive shaft.

3. In a speed-modifying mechanism for automobile, drive and driven shafts arranged in longitudinal alignment with each other, internal and external gears and an internal-external idler gear in intermeshing relation and adapted to produce a modification of speed said gears being operatively arranged between said shafts, and clutches arranged upon said shafts and upon opposite sides of said gears having releasable means for effecting operative connection between the shafts and the internal and external gears, respectively, or for rendering the gears ineffective, and having also releasable means for effecting direct connection between the shafts and simultaneously disconnecting said gears from said shafts.

4. In a speed-modifying mechanism for automobile, drive and driven shafts arranged in longitudinal alignment with each other, internal and external gears and an internal-external idler gear in intermeshing relation and adapted to produce a modification of speed said gears being operatively arranged between said shafts, and means for effecting operative connection between the shafts and the gears for producing modification of speed or for effecting direct connection between the shafts and simultaneously disconnecting the gears from the shafts.

5. In a speed-modifying mechanism for automobile, drive and driven shafts arranged in longitudinal alignment with each other, a unitary, self-contained reversible assembly comprising aligned stub shafts, internal and external gears and an internal-external idler gear in intermeshing relation and adapted to produce an over-speed or under-speed according to the arrangement of the assembly between said shafts, and clutch means arranged upon opposite sides of said gears and having means of releasable connection therewith for effecting operative connection between the shafts and the internal and external gears, respectively, for rendering the gears effective in producing a modification of speed and having also releasable means for effecting direct connection between said stub shafts and simultaneously disconnecting said gears from said shafts.

6. In a speed-modifying mechanism for automobile, drive and driven shafts arranged in longitudinal alignment with each other, internal and external gears and an internal-external idler gear in intermeshing relation and adapted to produce a modification of speed, said internal and external gears being mounted concentrically and said internal-external gear being mounted eccentrically with respect to the axis of said shafts, and clutch means arranged upon opposite sides of said gears and having means of releasable connection therewith for effecting operative connection between the shafts and the internal and external gears, respectively, for rendering the gears effective in producing a modification of speed and having also releasable means for effecting direct connection between said stub shafts and simultaneously disconnecting said gears from said shafts.

7. In a speed-modifying mechanism for automobile, a unitary, self-contained, reversible assembly comprising a housing, internal and external gears and an internal-external idler gear in intermeshing relation and enclosed within said housing and adapted to produce an over-speed or under-speed according to the arrangement of the assembly in connection with the drive shaft of the automobile, said assembly including also aligned stub shafts extending into said housing, one of said shafts affording concentric bearing means for said external gear, said external gear having a hub portion to serve as a bearing means for said internal gear, said idler gear having bearing in said housing eccentrically with respect to the longitudinal axis of said shafts, and said assembly including also clutch means arranged within said housing and upon opposite sides of said gears and having releasable means of connection therewith for effecting operative connection between the shafts and the internal and external gears, respectively, for rendering the gears effective in producing a modification of speed, and said clutch means having also releasable means for effecting direct connection between said stub shafts and simultaneously disconnecting said gears from said shafts, and means for connecting said reversible assembly in either of its two positions with the automobile drive shaft.

CHARLES M. WERT.